Dec. 13, 1966   R. LA ROSA   3,292,115
EASILY FABRICATED WAVEGUIDE STRUCTURES
Filed Sept. 11, 1964                    6 Sheets-Sheet 1

SECTION A-A-A

SECTION A-A-A

United States Patent Office 3,292,115
Patented Dec. 13, 1966

3,292,115
EASILY FABRICATED WAVEGUIDE
STRUCTURES
Richard La Rosa, South Hempstead, N.Y., assignor to
Hazeltine Research Inc., a corporation of Illinois
Filed Sept. 11, 1964, Ser. No. 395,748
7 Claims. (Cl. 333—73)

The present invention relates, in general, to waveguide structures, and more particularly, to waveguide structures which may be easily fabricated.

In the field of electronic research and development, the need often arises for various types of waveguide structures which are not commercially available, or are not conveniently obtainable. In such cases it would be advantageous to be able to readily and economically fabricate the needed waveguide structure from material on hand in the laboratory, or from a stock of prefabricated parts.

Prior methods have been developed for producing assemblable waveguides, as evidenced by Patent No. 2,995,806, to J. H. Allison, et al. Such prior methods have been limited to waveguide alone, and are not applicable to waveguide structures in general, including bends, terminations, directional couplers, filters, and other more complicated components and networks. The major problem which plagues each of the prior methods is that of insuring electrical continuity between the assembled walls of a waveguide structure, so that radio-frequency current flow between adjacent walls of the waveguide is not impaired. Typical of the prior solution to this problem is that shown in the patent referenced above, where the entire assembled waveguide must be dip-brazed to ensure electrical continuity. It will be recognized by those in the art who have used this method, that it is wholly unsatisfactory in that the dip-brazing process is cumbersome, time consuming, and cannot be used where printed circuit boards or other low temperature components are incorporated in the waveguide structure.

It is also known in the art that waveguide structures may be cast in two halves and later fastened together to provide a completed structure. The problem here is the expense, availability and permanency of cast waveguide structures. Such structures cannot be readily fabricated in the laboratory, and once the castings are made, any changes usually require that the original castings be scrapped and new ones be prepared. Needless to say, this too is a costly and time consuming fabrication method with many inherent drawbacks.

It is therefore an object of the present invention to provide new and improved waveguide structures which may be easily and economically fabricated.

It is another object of the present invention to provide new and improved easily fabricated waveguide structures which do not require permanent joining of their component parts to insure electrical continuity.

In accordance with the present invention an easily fabricated waveguide structure comprises a first pair of electrically conductive members which constitute opposite walls of a waveguide structure, the first pair of members each having a plurality of holes adapted to receive fastening means set forth hereinafter, the holes being along at least one direction which is generally parallel to a given propagation path in the waveguide structure. Also included is at least one additional electrically conductive member disposed between the first pair of members for providing at least one given propagation path in the waveguide structure, the additional member having a plurality of holes adapted to receive fastening means set forth hereinafter, the holes being along at least one direction which is generally parallel to the given propagation path in the waveguide structure, and being in alignment with at least some of the holes in the first pair of members. Finally the present invention includes a plurality of fastening means which, when the first pair of members and the additional member are assembled so that holes in the first pair of members align with holes in the additional member are placed in each of the aligned holes for securing the first pair of members and the additional member together in the assembled relationship to form a waveguide structure, and for providing electrical continuity between the first pair of members and the additional member for radio-frequency currents.

For a better understanding of the present invention, together with other and further objects thereof, reference is had to the following description taken in connection with the accompanying drawings and its scope will be pointed out in the appended claims.

Referring to the drawings:

FIG. 1a is an exploded isometric view of a simple waveguide structure constructed according to one form of the present invention, FIG. 1b is a modified cross-sectional view of the waveguide structure of FIG. 1a taken through the section plane A—A—A, FIG. 2 is an exploded isometric view of a portion of a waveguide structure constructed according to another form of the present invention, FIG. 3 is an exploded isometric view of a portion of a waveguide structure having two intercoupled propagation paths constructed according to still another form of the present invention;

*Description of waveguide structure of FIG. 1.*

Figure 1A:
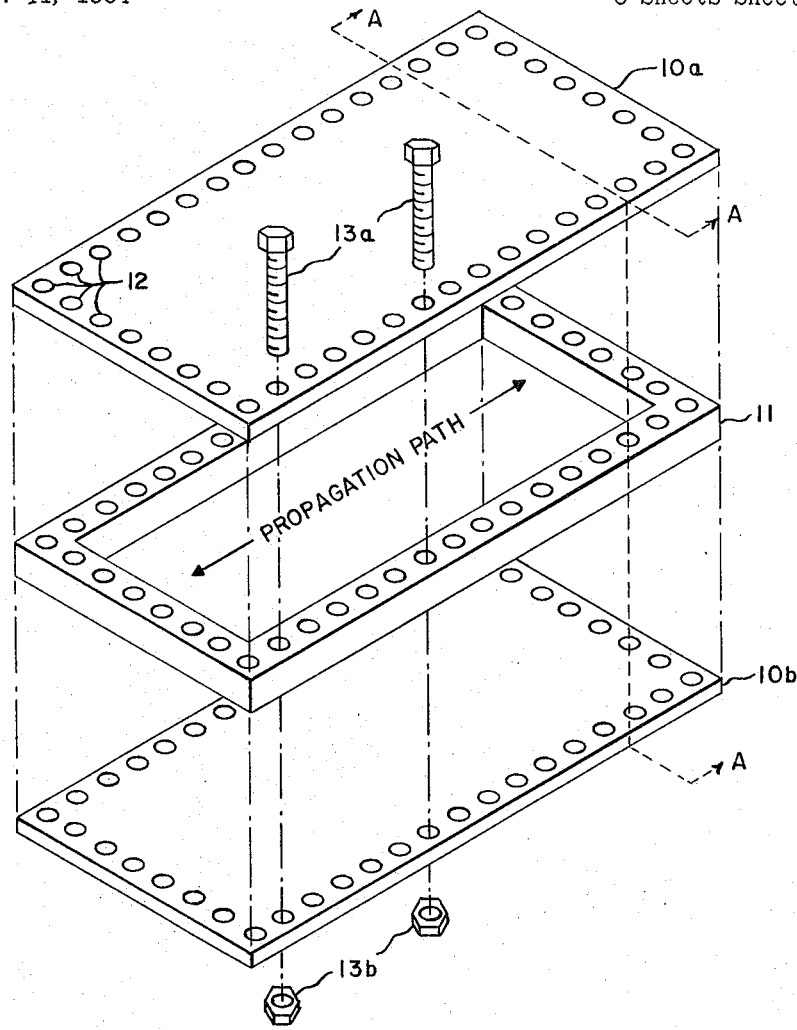

Shown in FIG. 1a of the drawings is a simple waveguide structure which embodies the present invention in one form. The waveguide structure of FIG. 1a consists of a first pair of electrically conductive members 10a and 10b, which constitute opposite walls of the structure. First pair of members 10a and 10b each have a plurality of holes 12, as shown, adapted to receive fastening means 13a and 13b. The holes 12 in members 10a and 10b are along at least one direction which is generally parallel to the propagation path in the waveguide structure of FIG. 1a. As shown, the holes 12 are in fact along two directions; one generally parallel to, and another generally perpendicular to, the propagation path in the structure of FIG. 1a.

The waveguide structure of FIG. 1a also includes an additional electrically conductive member 11 disposed between the first pair of members 10a and 10b, for providing a propagation path in the waveguide structure. As shown, the propagation path is formed by removing predetermined areas of member 11. Member 11 also has a plurality of holes 12, which are adapted to receive fastening means 13a. The holes 12 in member 11 are along one direction generally parallel to, and another direction generally perpendicular to the propagation path in the waveguide structure of FIG. 1a, and are also in alignment with the holes in the first pair of members 10a and 10b.

The waveguide structure of FIG. 1a finally includes a plurality of fastening means, which in the present example are shown as being bolts 13a and their associated nuts 13b. When the first pair of members 10a and 10b and the additional member 11 are assembled as shown, so that holes 12 in members 10a and 10b align with holes 12 in member 11, the fastening means 13a are placed in each of the aligned holes for securing members 10a, 10b and 11 together in the assembled relationship to form a waveguide structure, and for providing electrical continuity between members 10a and 10b, and member 11 for radio-frequency current.

While in FIG. 1a the fastening means are shown as being bolts 13a and their associated nuts 13b, it is not meant to limit them to being that only. Conventional screws, self-tapping screws, or rivets could be used equally well, and those skilled in the art will be able to obviously adapt other temporary and permanent fastening means for use with the present invention. The limitation on fastening means used is only that they be capable of securing the members together firmly enough to provide electrical continuity for radio-frequency currents.

The individual members and fastening means of FIG. 1a may be constructed of any of the conventional materials presently used in the art of waveguide fabrication, such as brass, bronze, copper or aluminum, for example.

Figure 1B:
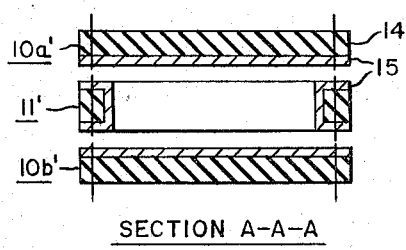

Additionally, the members of FIG. 1a may be constructed, as shown in the modified cross-section of FIG. 1b, of an insulating material 14 covered by a conductive medium 15 such as is used in producing printed circuit boards. This technique produces in waveguide the counterpart of stripline.

Figure 2:
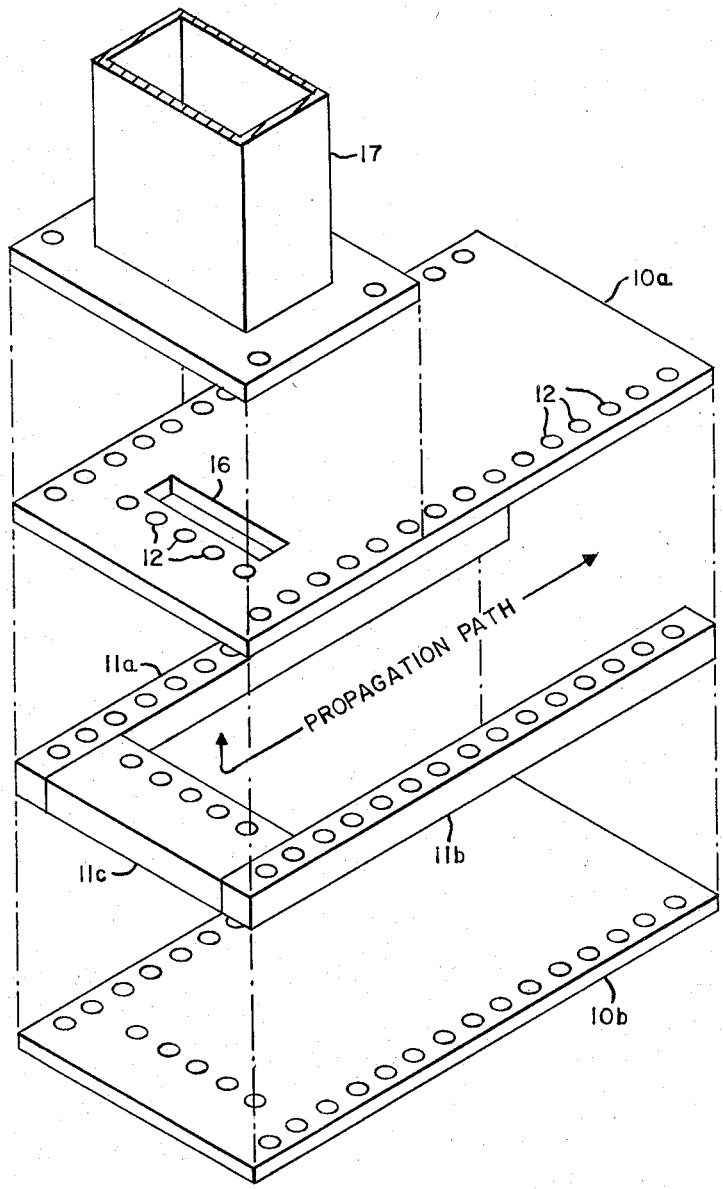

While the waveguide structure of FIG. 1a shows no specific means for coupling wave energy into and out of the waveguide structure, it will be obvious to those skilled in the art that any of the conventional and well known methods may be used, such as the iris 16 and conventional waveguide flange 17 shown in FIG. 2, for example.

While the apparatus of FIG. 1a is useful for waveguide structures of relatively short length, it becomes difficult to fabricate the additional member 11 in one piece where the length of the required waveguide structure is long. In this case the waveguide structure may be constructed as shown in FIG. 2.

The apparatus of FIG. 2 is similar to that of FIG. 1a, except that disposed between the first pair of members 10a and 10b there are a plurality of additional electrically conductive members 11a, 11b, and 11c which, when arranged as shown, perform the same function as the single member 11 of FIG. 1a.

Also shown in FIG. 2 is a typical means for coupling energy into and/or out of, the waveguide structure, consisting of iris 16 and conventional waveguide flange 17, whose construction and operation is well understood in the art.

It will be noted that there are a plurality of holes 12 along a second direction generally transverse to the propagation path which fall under the waveguide flange 17 in the waveguide structure of FIG. 2. In such case, the holes should be counter-sunk to accept fastening means, such as flat-headed screws, so that the fastening means do not interfere with flange 17.

In addition, the transverse holes should be kept as close as possible to the edge of iris 16, in order to insure electrical continuity in this area.

Figure 3:
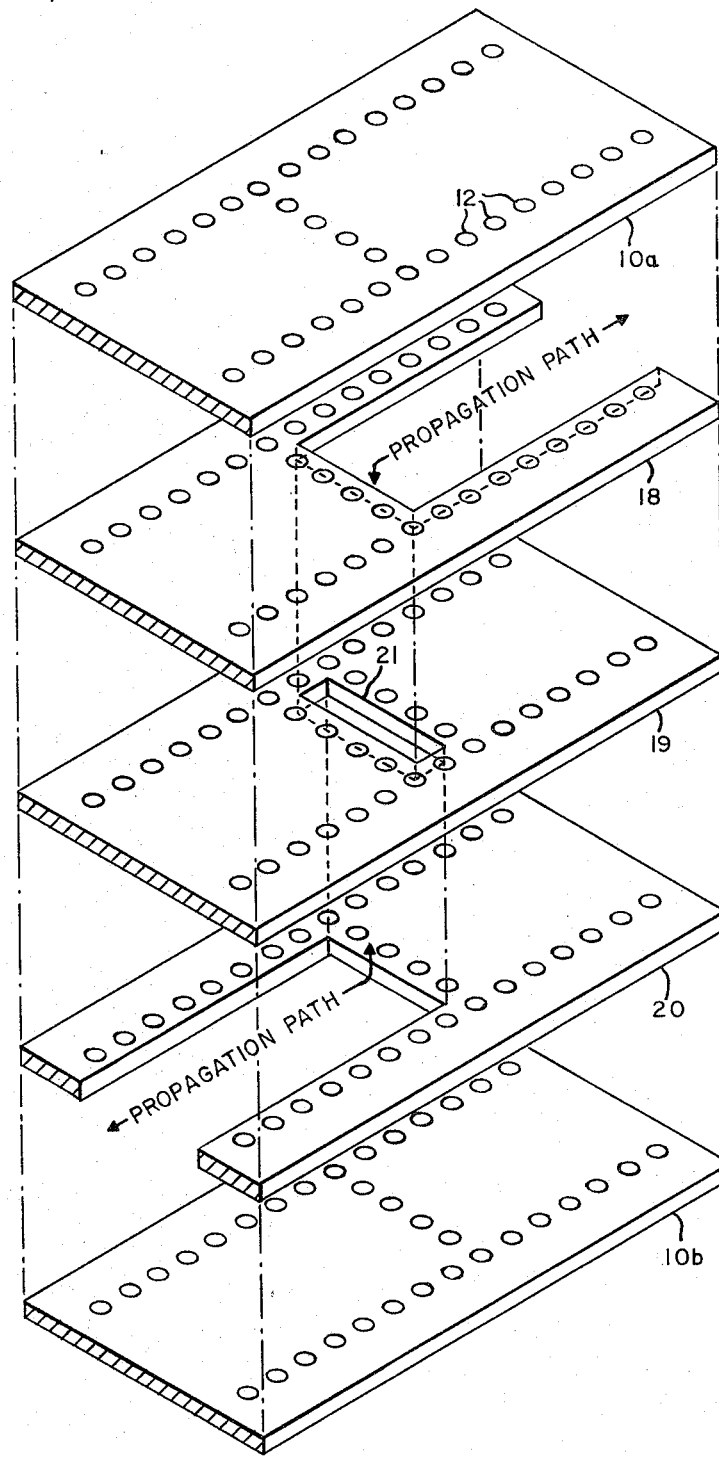

In FIG. 3 of the drawings, there is shown another embodiment of the present invention. In this case again, there are a plurality of additional electrically conductive members 18, 19, and 20, disposed between the first pair of members 10a and 10b. However, in this case, the additional members are placed one on top of the other, in a sandwichlike configuration, as shown in FIG. 3. Iris coupling is provided between the two propagation paths in members 18 and 20, by an iris, or port 21, cut in member 19, in a manner well known in the art. The separate waveguide cavities in members 18 and 20 are arranged to overlap one another by the width of the iris 21, as is shown in FIG. 3.

Figure 4A:
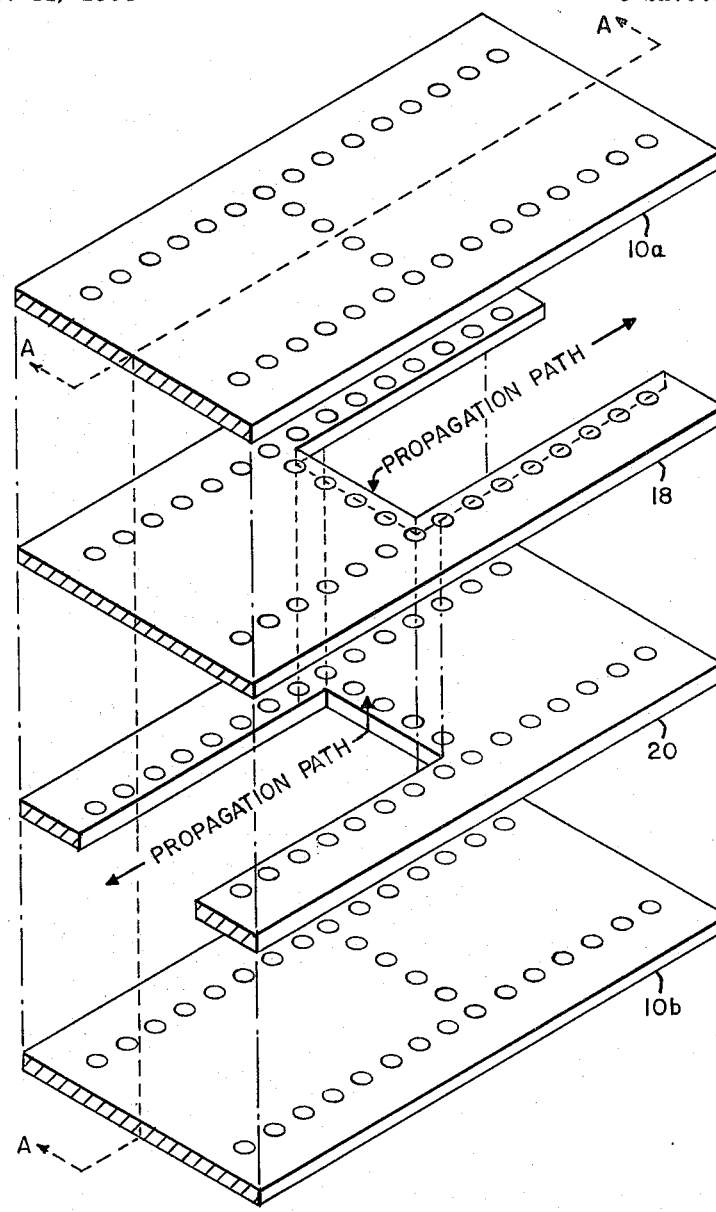
FIG. 4a is an exploded isometric view of a portion of another type waveguide structure having two intercoupled propagation paths constructed according to one form of the present invention.
Figure 4B:
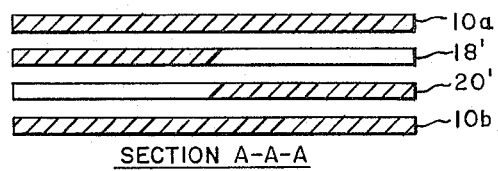
FIG. 4b is a modified cross-sectional view of the waveguide structure of FIG. 4a taken through the section plane A—A—A.

The iris member 21 of FIG. 3 may be eliminated, as shown in FIG. 4a, to reduce the size and weight of the waveguide structure when necessary. A more efficient coupling between the two waveguide cavities of FIG. 4 may be had by beveling the end of members 18 and 20 at the overlap, as shown in the modified cross-section of FIG. 4b, to provide less of a discontinuity at the coupling point of the two propagation paths.

Figure 5:
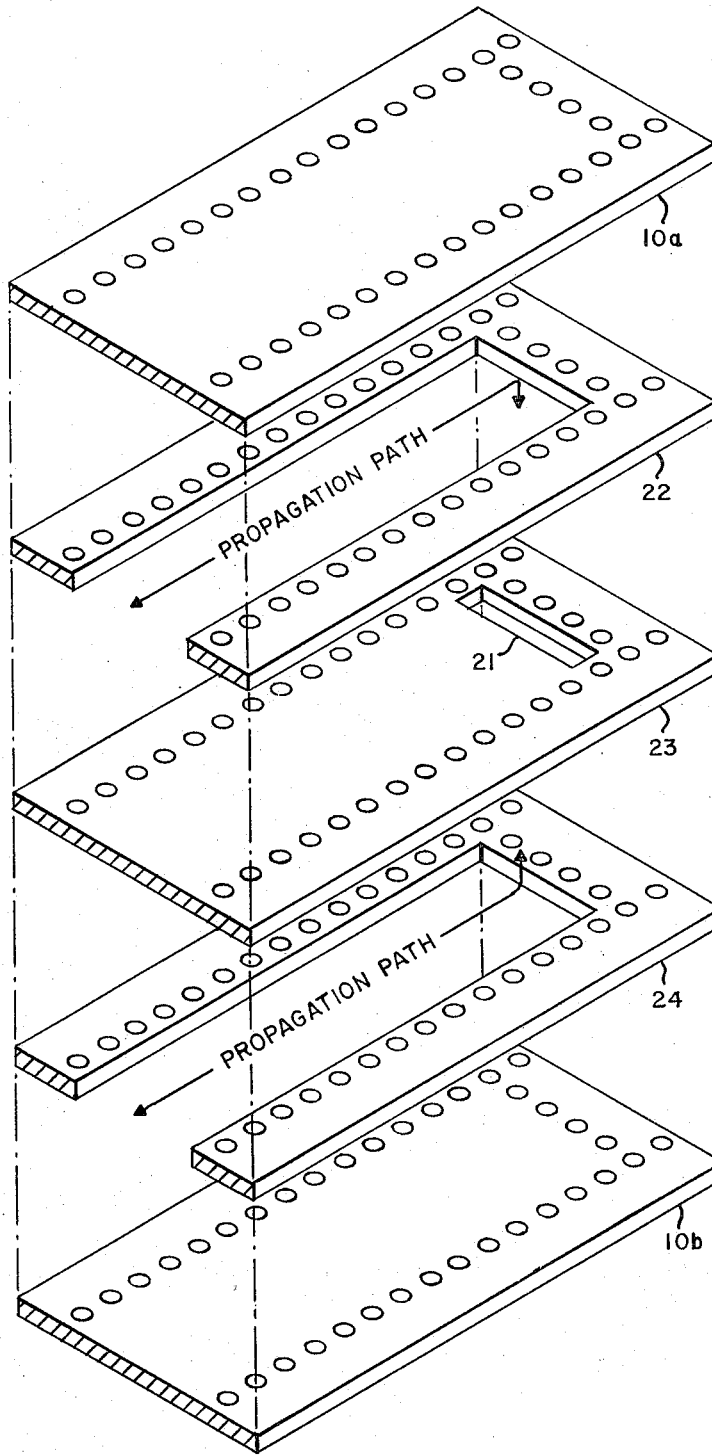
FIG. 5 is an exploded isometric view of a portion of still another type waveguide structure having two intercoupled propagation paths constructed to one form of the present invention.

In FIG. 5 of the drawings there is shown another embodiment of the present invention which provides a waveguide structure in the form of a U bend. In this case the additional members 22, 23 and 24 are again disposed between a first pair of members 10a and 10b, in a manner similar to that shown in FIG. 3. Here again an iris 21 is provided in the center member 23 for coupling the waveguide cavities in members 22 and 24 together.

Figure 6:
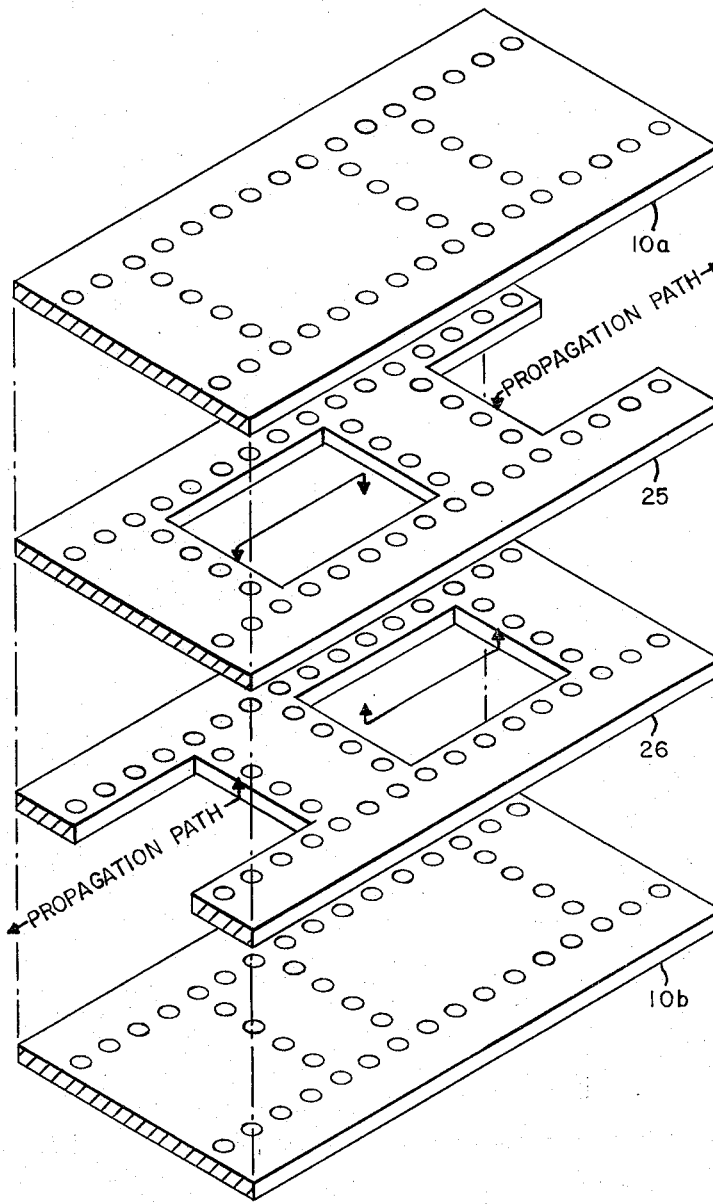
FIG. 6 is an exploded isometric view of a portion of a waveguide structure having a plurality of series-coupled filters constructed according to one form of the present invention.

In FIG. 6, there is shown yet another embodiment of the present invention in the form of a waveguide structure which provides a plurality of series-coupled filters, using the technique described previously in connection with the waveguide structure shown in FIG. 4a. Each of the additional members 25 and 26 provides both a waveguide cavity, and a resonant cavity or filter. Each of the cavities is made to overlap the next successive cavity in order to provide iris coupling between them as described previously in connection with the waveguide structure of FIG. 4a. While only two series filters are shown in the waveguide structure of FIG. 6, it will be understood that any desired number may be provided by extending the technique described above.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:
1. An easily fabricated waveguide structure, comprising:
    a first pair of electrically conductive members which constitute opposite walls of a waveguide structure, said first pair of members each having a plurality of holes adapted to receive fastening means set forth hereinafter, said holes being along at least one direction which is generally parallel to a given propagation path in said waveguide structure;
    at least one additional electrically conductive member disposed between said first pair of members and constituting other opposite walls and ends of said waveguide structure for providing at least one given propagation path in said waveguide structure, said additional member having a plurality of holes adapted to receive fastening means set forth hereinafter, said holes being along at least one direction which is generally parallel to said given propagation path in said waveguide structure, and being in alignment with at least some of the holes in said first pair of members;

and a plurality of fastening means which, when said first pair of members and said additional member are assembled so that holes in said first pair of members align with holes in said additional member, are placed in each of said aligned holes for securing said first pair of members and said additional member together in said assembled relationship to form a waveguide structure, and for providing electrical continuity between said first pair of members and said additional member for radio-frequency currents.

2. An easily fabricated waveguide structure as recited in claim 1 in which said electrically conductive members are each composed of an insulating material having at least one surface covered by a conductive medium.

3. An easily fabricated waveguide structure, comprising:

a first pair of electrically conductive members which constitute opposite walls of a waveguide structure, said first pair of members each having a plurality of holes adapted to receive fastening means set forth hereinafter, said holes being along at least one direction which is generally parallel to a given propagation path in said waveguide structure;

at least one additional electrically conductive member disposed between said first pair of members and constituting other opposite walls and ends of said waveguide structure for providing at least two intercoupled propagation paths in said waveguide structure, said additional member having a plurality of holes adapted to receive fastening means set forth hereinafter, said holes being along at least one direction which is generally parallel to said given propagation path in said waveguide structure, and being in alignment with at least some of the holes in said first pair of members;

and a plurality of fastening means which, when said first pair of members and said additional member are assembled so that holes in said first pair of members align with holes in said additional member are placed in each of said aligned holes for securing said first pair of members and said additional member together in said assembled relationship to form a waveguide structure, and for providing electrical continuity between said first pair of members and said additional member for radio-frequency currents.

4. An easily fabricated waveguide structure, comprising:

a first pair of electrically conductive members which constitute opposite walls of a waveguide structure, said first pair of members each having a plurality of holes adapted to receive fastening means set forth hereinafter, said holes being along at least one direction which is generally parallel to a given propagation path in said waveguide structure;

at least one additional electrically conductive member disposed between said first pair of members and constituting other opposite walls and ends of said waveguide structure, said additional member having predetermined areas removed therefrom to provide at least one given propagation path in said waveguide structure, said additional member having a plurality of holes adapted to receive fastening means set forth hereinafter, said holes being along at least one direction which is generally parallel to said given propagation path in said waveguide structure, and being in alignment with at least some of the holes in said first pair of members;

and a plurality of fastening means which, when said first pair of members and said additional member are assembled so that holes in said first pair of members align with holes in said additional member, are placed in each of said aligned holes for securing said first pair of members and said additional member together in said assembled relationship to form a waveguide structure, and for providing electrical continuity between said first pair of members and said additional member for radio-frequency currents.

5. An easily fabricated waveguide structure as recited in claim 4 in which said electrically conductive members are each composed of an insulating material having at least one surface covered by a conductive medium.

6. An easily fabricated waveguide structure, comprising:

a first pair of electrically conductive members which constitute opposite walls of a waveguide structure, said first pair of members each having a plurality of holes adapted to receive fastening means set forth hereinafter, said holes being along at least one direction which is generally parallel to a given propagation path in said waveguide structure;

at least one additional electrically conductive member disposed between said first pair of members and constituting other opposite walls and ends of said waveguide structure, said additional member having predetermined areas removed therefrom for providing at least two intercoupled propagation paths in said waveguide structure, said additional member having a plurality of holes adapted to receive fastening means set forth hereinafter, said holes being along at least one direction which is generally parallel to said given propagation path in said waveguide structure, and being in alignment with at least some of the holes in said first pair of members;

and a plurality of fastening means which, when said first pair of members and said additional member are assembled so that holes in said first pair of members align with holes in said additional member, are placed in each of said aligned holes for securing said first pair of members in said additional member together in said assembled relationship to for a waveguide structure, and for providing electrical continuity between said first pair of members and said additional member for radio-frequency currents.

7. An easily fabricated waveguide structure, comprising:

a first pair of electrically conductive members which constitute opposite walls of a waveguide structure, said first pair of members each having a plurality of holes adapted to receive fastening means set forth hereinafter, said holes being along at least one direction which is generally parallel to a given propagation path in said waveguide structure;

a plurality of additional electrically conductive members disposed between said first pair of members and constituting other opposite walls and ends of said waveguide structure for providing a plurality of series-coupled filters in said waveguide structure, at least some of said plurality of members each having a plurality of holes adapted to receive fastening means set forth hereinafter, said holes being along at least one direction which is generally parallel to said given propagation path in said waveguide structure, and being in alignment with at least some of the holes in said first pair of members;

and a plurality of fastening means which, when said first pair of members and said plurality of members are assembled so that holes in said first pair of members align with holes in said plurality of members, are placed in each of said aligned holes for securing said first pair of members and said plurality of members together in said assembled relationship to form a waveguide structure, and for providing electrical continuity between said first pair of members and said plurality of members for radio-frequency currents.

References Cited by the Examiner

UNITED STATES PATENTS

| | | | |
|---|---|---|---|
| 2,995,806 | 8/1961 | Allison et al. | 333—95 |
| 2,996,790 | 8/1961 | Trafford | 333—95 |
| 3,150,336 | 9/1964 | Gonda | 333—98 |
| 3,195,079 | 7/1965 | Burton | 333—95 |

FOREIGN PATENTS 2,467   2/1903   Great Britain.

OTHER REFERENCES

Harvey, A. F.: Microwave Engineering, 1963, Academic Press, New York; page 51 relied on.

HERMAN KARL SAALBACH, *Primary Examiner.*

L. ALLAHUT, *Assistant Examiner.*